3,397,230
NITRATION OF TETRACYCLINES
Robert Winterbottom, New City, Panayota Bitha, New York, and Henry Marcel Kissman, Nanuet, N.Y., assignors to American Cyanamid Company, Stamford, Conn., a corporation of Maine
No Drawing. Filed Mar. 14, 1966, Ser. No. 533,830
10 Claims. (Cl. 260—559)

This invention relates to a novel nitration process for preparing compounds having the following general formula:

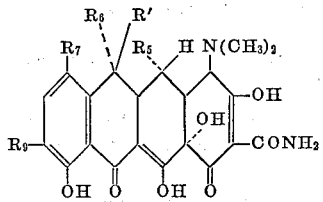

wherein $R_5$ is hydrogen or hydroxy, $R'$ is hydrogen or hydroxy, $R_6$ is hydrogen or methyl, $R'$ and $R_6$ taken together is methylene, $R_7$ is hydrogen or nitro and $R_9$ is hydrogen or nitro with the proviso that $R_7$ and $R_9$ cannot both be hydrogen. More particularly, the present invention comprises nitrating a compound of the general formula:

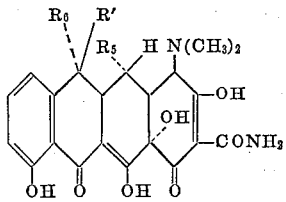

wherein $R_5$, $R'$ and $R_6$ are as hereinabove defined, with nitronium tetrafluoroborate in a polar solvent inert to the reactants.

Specific starting materials operable in this nitration process include tetracycline, 6-methylenetetracycline, 5-hydroxytetracycline, 5-hydroxy-6 - methylenetetracycline, 6-demethyltetracycline, 6-deoxytetracycline, 6-demethyl-6-deoxytetracycline, 5-hydroxy-6-demethyltetracycline, 5-hydroxy-6-deoxytetracycline and 5-hydroxy-6-demethyl-6-deoxytetracycline.

As will be apparent from the examples which follow, the nitration of the tetracycline starting materials results in two mononitro isomers with the nitro group attached to the aromatic ring of the tetracycline nucleus in the ortho-position to the hydroxyl group in one compound and in the para-position to the hydroxyl group in the other compound, or in other words, in one isomer the nitro group is in the 7-position of the aromatic ring whereas in the other isomer it is in the 9-position. These mononitro isomers may be readily separated by the standard methods such as fractional crystallization or paper strip chromatography. If a mononitro derivative is desired, then one molar equivalent of nitronium tetrafluoroborate is employed, whereas if the 7,9-dinitro derivative is desired, then two molar equivalents of nitronium tetrafluoroborate are employed.

Inert polar solvents suitable for the novel process of the present invention include, for example, nitromethane, acetonitrile, dimethylformamide, nitrobenzene, etc. These solvents or mixtures thereof, should be employed in the anhydrous state.

Temperature is not a critical factor. Temperatures of from about 0° C. to about 35° C. can be employed. A temperature of from about 15° C. to about 25° C. is, however, preferred since it produces the desired products in higher yield. Somewhat higher temperatures, while operative, tend to result in diminished yields. The time of reaction is likewise not a critical factor. The time necessary to obtain substantially complete reaction varies, of course, with the reaction temperature and the reactivity of the particular tetracycline starting material employed. In the preferred temperature range of from about 15° C. to about 25° C., a reaction period of from about one hour to about four hours results in a substantial nitration of the tetracycline starting material.

The products are recovered from the reaction mixture by conventional methods. For example, the product may be isolated by precipitation with a solvent such as diethyl ether or hexane or by concentration, usually under reduced pressure, or by a combination of these. Work-up of the reaction mixtures to obtain the desired nitroproducts may also be accomplished by known procedures such as precipitation, concentration, solvent extraction, or a combination of these procedures. After isolation, the products may be purified by any of the generally known methods for purification of tetracycline compounds. These include recrystallization from various solvents and mixed solvent systems, chromatographic techniques, and counter current distribution, all of which are usefully employed for this purpose.

The tetracycline starting materials may be employed in the novel nitration process of the present invention either in the form of their free bases or in the form of their salts with various organic and inorganic acids, depending upon the solubility characteristics desired.

The 7- and/or 9-nitrotetracyclines prepared by the novel nitration process of the present invention are useful as intermediates in the preparation of biologically active substituted 7- and/or 9-aminotetracyclines as is more fully set forth in U.S. Patent 3,148,212 to Boothe et al. and in our copending applications filed concurrently herewith.

Typical compounds which may be prepared by the novel nitration process of the present invention include, for example, 7-nitrotetracycline,
9-nitrotetracycline,
6-demethyl-7-nitrotetracycline,
6-demethyl-9-nitrotetracycline,
5-hydroxy-7-nitrotetracycline,
5-hydroxy-9-nitrotetracycline,
5-hydroxy-6-methylene-7-nitrotetracycline,
5-hydroxy-6-methylene-7,9-dinitrotetracycline,
6-demethyl-6-deoxy-7-nitrotetracycline,
6-demethyl-6-deoxy-7,9-dinitrotetracycline,
6-deoxy-9-nitrotetracycline,
6-deoxy-7,9-dinitrotetracycline,
7-nitro-6-methylenetetracycline,
9-nitro-5-hydroxy,-6-demethyltetracycline,
7-nitro-5-hydroxy-6-deoxytetracycline, and
7,9-dinitro-5-hydroxy-6-demethyl-6-deoxytetracycline.

The following examples are given by way of illustration and are not to be regarded as limitations of this invention, many variations of which are possible without departing from the spirit or scope thereof.

Example 1.—Preparation of nitronium tetrafluoroborate

A 17 ml. (20 gm.; specific gravity 1.124) portion of nitromethane and 9.4 ml. (14 gm.) of fuming nitric acid were mixed in a polyethylene container held at —6° C. in a bath consisting of 20% isopropyl alcohol, 80% water and Dry Ice. A 4 ml. (3.94 gm.) portion of hydrofluoric acid was added and the mixture was saturated with boron trifluoride at —6° C. until boron trifluoride fumes were released. The white crystalline precipitate was filtered through a glass funnel under nitrogen atmosphere and then washed with 20 ml. of nitromethhane and 20 ml. of 1,1,2-trifluorotrichloroethane (Freon 113). The material was transferred to a 3 neck flask and dried in vacuum at 60–70° C. for 1½ hours.

Example 2.—Preparation of 7-nitrotetracycline and 9-nitrotetracycline

A 1.0 gram portion of tetracycline neutral was dissolved in 40 ml. of nitromethane. A 0.312 gram portion of nitronium tetrafluoroborate was added and the solution was stirred for 1½ hours at 25° C. To this was added 500 ml. of diethyl ether and the product which precipitated was isolated by filtration. The product was dried at 35° C. yielding 1.203 grams (as the fluoroboric acid salt). The 7- and 9-nitro isomers were separated as described in Example 4.

Example 3.—Preparation of 6-demethyl-7-nitrotetracycline and 6-demethyl-9-nitrotetracycline A 1.66 gm. portion of 6-demethyltetracycline was dried from a mixture of 45 ml. of methanol and 75 ml. of benzene. The dried product was then dissolved in 80 ml. of nitromethane. A 0.513 gm. portion of nitronium tetrafluoroborate ($NO_2BF_4$) was added to the solution followed by 1½ hours of stirring. The solution was then diluted with 1 liter of diethyl ether. The light yellow precipitate was filtered and dried at 40° C. for 16 hours yielding 1.383 gm. of crude product having the following spectra:

$\lambda_{max.}^{0.1\ NH_2SO_4} = 265, 354\ m\mu$ with $265/354 = 1.48$ $\lambda_{max.}^{0.1\ N\ NaOH} = 240, 265, 280, 365\ m\mu$ with $380/465 = 6.3$ Example 4.—Chromatographic separation of the 7-nitro and 9-nitro isomers of 6-demethyltetracycline A 100 gm. portion of acid washed Celite was suspended in a solution of 20 gm. of ethylenediaminetetraacetic acid disodium salt in 500 ml. of water. To this was added 500 ml. of 2 N HCl and the solution was stirred for 20 hours at room temperature. The Celite was filtered through a sintered glass funnel and washed first with 6 liters of distilled water by displacement and secondly with 500 ml. of methanol by displacement. The Celite was then dried at 50° C. in a vacuum oven for 20 hours. This Celite was then used with the system heptane:ethyl acetate:methanol:water (5:8:2:2) to effect a separation between 6-demethyl-7-nitrotetracycline and 6-demethyl-9-nitrotetracycline. The pure products have the following spectra:

7-Nitro: $\lambda_{max.}^{0.1\ N\ H_2SO_4} = 260, 352\ m\mu$ with $260/352 = 1.82$ $\lambda_{max.}^{0.1\ N\ NaOH} = 235, 280, 375\ m\mu$ with $380/460 = 3.46$ 9-Nitro: $\lambda_{max.}^{0.1\ N\ H_2SO_4} = 260, 361\ m\mu$ with $260/361 = 1.6$ $\lambda_{max.}^{0.1\ N\ NaOH} = 225, 280, 355, 430\ m\mu$ with $380/460 = 1.09$ Example 5.—Preparation of 5-hydroxy-7-nitrotetracycline and 5-hydroxy-9-nitrotetracycline A 1.0 gm. portion of 5-hydroxytetracycline, dried from a mixture of 30 ml. of methanol and 30 ml. of benzene, was dissolved in 40 ml. of nitromethane. A 0.3 gm. portion of nitronium tetrafluoroborate was added and the solution was stirred for 4 hours at 25° C. The solution was diluted with 500 ml. of diethyl ether and the product was isolated by filtration. The yield after drying at 35° C. was 1.706 gm.

Example 6.—Preparation of 6-demethyl-6-deoxy-7-nitrotetracycline and 6-demethyl-6-deoxy-9-nitrotetracycline A 1.0 gm. portion of 6-demethyl-6-deoxytetracycline neutral was dried from a mixture of 30 ml. of methanol and 30 ml. of benzene. The dried product was dissolved in 40 ml. of nitromethane. A 0.325 gm. portion of nitronium tetrafluoroborate was added and the solution was stirred for 1½ hours at 25° C. The solution was then diluted with 500 ml. of diethyl ether. The product was isolated by filtration and dried at 35° C. The yield was 1.065 gm. of crude material.

Example 7.—Preparation of 6-deoxy-7-nitrotetracycline and 6-deoxy-9-nitrotetracycline A 1.0 gm. portion of 6-deoxytetracycline, dried from the same solvent mixture described in Example 6, was dissolved in 30 ml. of nitromethane. A 0.345 gm. portion of nitronium tetrafluoroborate was added and the solution was stirred for 2 hours at 25° C. The solution was diluted with 500 ml. of diethyl ether. The product was isolated by filtration and dried at 35° C. The yield was 1.151 gm. and had the following analysis:

Calculated for $C_{22}H_{23}N_3O_9 \cdot HBF_4$: $N = 7.49$. Found: $N = 7.03$.

The 7- and 9-nitro isomers were separated as described in Example 4.

Example 8.—Nitration of 6-demethyl-6-deoxy-7-nitrotetracycline to give 6-demethyl-6-deoxy-7,9-dinitrotetracycline A 0.5 gm. portion of 6-demethyl-6-deoxy-7-nitrotetracycline neutral, previously dried from a methanol-benzene mixture, was dissolved in 15 ml. of nitromethane. A 0.152 gm. portion of nitronium tetrafluoroborate was added and the solution was stirred for 4 hours at 25° C. A crystalline precipitate formed. This was filtered off and dried at 35° C. yielding 46 mg. (Crop No. 1). The filtrate was diluted with 300 ml. of diethyl ether. The precipitate was isolated by filtration and dried at 35° C. yielding 440 mg. (Crop No. 2).

Crop No. 1: $\lambda_{max.}^{0.1\ N\ H_2SO_4} = 262, 350\ m\mu$ with $262/350 = 1.48$ $\lambda_{max.}^{0.1\ N\ NaOH} = 240, 283, 357\ m\mu$ with $380/460 = 4.6$ Polarogram indicated the presence of both the 7-nitro and the 9-nitro group for both crops.

Crop No. 2: $\lambda_{max.}^{0.1\ N\ H_2SO_4} = 262, 350\ m\mu$ with $262/350 = 1.52$ $\lambda_{max.}^{0.1\ N\ NaOH} = 239, 284, 357\ m\mu$ with $380/460 = 4.22$ Example 9.—Nitration of 6-demethyl-6-deoxy-9-nitrotetracycline to give 6-demethyl-6-deoxy-7,9-dinitrotetracycline.

A 0.2 gm. portion of 6-demethyl-6-deoxy-9-nitrotetracycline neutral was dried. This dried portion was dissolved in 6 ml. of nitromethane. A 64 mg. portion of nitronium tetrafluoroborate was added and the mixture was stirred for 4 hours at 25° C. The solution was diluted with 200 ml. of diethyl ether. The precipitate was isolated by filtration and dried at 35° C. yielding 0.25 gm. of product having the following spectra:

$\lambda_{max.}^{0.1\ N\ H_2SO_4} = 258, 355, 420\ m\mu$ with $258/355 = 4.0$ $\lambda_{max.}^{0.1\ N\ NaOH} = 250, 280, 435\ m\mu$ with $380/460 = 0.85$ Polarogram indicated the presence of the 7-nitro and the 9-nitro groups.

What is claimed is:
1. The process of preparing compounds of the formula:

wherein $R_5$ is selected from the group consisting of hydrogen and hydroxy, $R'$ is selected from the group consisting of hydrogen and hydroxy, $R_6$ is selected from the group consisting of hydrogen and methyl, $R'$ and $R_6$ taken together is methylene, $R_7$ is selected from the group consisting of hydrogen and nitro and $R_9$ is selected from the group consisting of hydrogen and nitro with the proviso that $R_7$ and $R_9$ cannot both be hydrogen, which comprises contacting a compound of the formula:

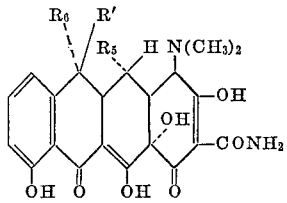

wherein $R_5$, $R'$ and $R_6$ are as hereinabove defined, with nitronium tetrafluoroborate in a polar solvent inert to the reactants.

2. A process according to claim 1 wherein $R_5$ is hydrogen, $R'$ is hydroxy, $R_6$ is methyl, $R_7$ is nitro and $R_9$ is hydrogen.

3. A process according to claim 1 wherein $R_5$ is hydrogen, $R'$ is hydroxy, $R_6$ is methyl, $R_7$ is hydrogen and $R_9$ is nitro.

4. A process according to claim 1 wherein $R_5$ is hydrogen, $R'$ is hydroxy, $R_6$ is hydrogen, $R_7$ is nitro and $R_9$ is hydrogen.

5. A process according to claim 1 wherein $R_5$ is hydrogen, $R'$ is hydroxy, $R_6$ is hydrogen, $R_7$ is hydrogen and $R_9$ is nitro.

6. A process according to claim 1 wherein $R_5$ is hydroxy, $R'$ is hydroxy, $R_6$ is methyl, $R_7$ is nitro and $R_9$ is hydrogen.

7. A process according to claim 1 wherein $R_5$ is hydroxy, $R'$ is hydroxy, $R_6$ is methyl, $R_7$ is hydrogen and $R_9$ is nitro.

8. A process according to claim 1 wherein $R_5$ is hydrogen, $R'$ is hydrogen, $R_6$ is hydrogen, $R_7$ is nitro and $R_9$ is hydrogen.

9. A process according to claim 1 wherein $R_5$ is hydrogen, $R'$ is hydrogen, $R_6$ is methyl, $R_7$ is nitro and $R_9$ is hydrogen.

10. A process according to claim 1 wherein $R_5$ is hydrogen, $R'$ is hydrogen, $R_6$ is hydrogen, $R_7$ is nitro and $R_9$ is nitro.

References Cited

UNITED STATES PATENTS 3,341,586   9/1967   Bitha et al. _____ 260—559

NICHOLAS S. RIZZO, *Primary Examiner.*

A. M. TIGHE, *Assistant Examiner.*